United States Patent
Ikeda et al.

(10) Patent No.: US 7,357,543 B2
(45) Date of Patent: Apr. 15, 2008

(54) VEHICLE LIGHTING DEVICE

(75) Inventors: Toshimasa Ikeda, Shizuoka (JP); Yoshihiro Miyagawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 71 days.

(21) Appl. No.: 11/250,893

(22) Filed: Oct. 13, 2005

(65) Prior Publication Data

US 2006/0077681 A1 Apr. 13, 2006

(30) Foreign Application Priority Data

Oct. 13, 2004 (JP) ............................. 2004-298598

(51) Int. Cl.
*F21V 1/00* (2006.01)
(52) U.S. Cl. ...................... 362/509; 362/507
(58) Field of Classification Search ...................... None
See application file for complete search history.

(56) References Cited

U.S. PATENT DOCUMENTS 4,574,338 A * 3/1986 Takasaki et al. ............ 362/278

6,184,280 B1 * 2/2001 Shibuta ...................... 524/405
7,097,334 B2 * 8/2006 Ishida et al. ................ 362/516

FOREIGN PATENT DOCUMENTS

| JP | 2000-294012 | * 12/1999 | ................... 8/10 |
| JP | 2000-294012 | 10/2000 | |

OTHER PUBLICATIONS

Patent Abstracts of Japan, Publication No. 2000-294012, Publication Date Oct. 20, 2000, 1 page.

* cited by examiner

*Primary Examiner*—Sharon E. Payne
*Assistant Examiner*—Kristen A Manskar
(74) *Attorney, Agent, or Firm*—Osha Liang LLP

(57) ABSTRACT

A vehicle lighting device in which a housing having a concave portion, which is opened forward, and a lens for covering a front opening of the housing are joined together by a laser welding, wherein the housing is formed of a thermoplastic resin of a chromatic color, and carbon of 0.01 to 0.1% is contained in the thermoplastic resin of the chromatic color.

4 Claims, 1 Drawing Sheet

VEHICLE LIGHTING DEVICE

The present application claims foreign priority based on Japanese Patent Application No. 2004-298598, filed Oct. 13, 2004, the content of which is incorporated herein by reference.

BACKGROUND OF THE INVENTION

1. Technical Field

The present invention relates to a vehicle lighting device and, more particularly, the technology to improve a pleasant appearance of a vehicle lighting device in which a lens and a housing are joined together by the laser welding, especially an inner area of pleasing appearance when such inner area is looked through a lens.

2. Related Art

The laser welding can carry out surely joint of two members in a short time with good outer appearance. Therefore, such laser welding is suited for the joint between the lens and the housing in the vehicle lighting device.

In the vehicle lighting device, when the lens is joined to the housing by the laser welding, normally the welded portion of the housing is irradiated with the laser beam that is passed through the lens. Then, the welded portion of the housing generates a heat and melts in response to the irradiation of the laser beam, and then such heat is conducted to the welded portion of the lens to melt that portion. Thus, both portions are joined together.

For that purpose, the material such as an acrylic resin (poly(methyl methacrylate)), or the like, which has the good transmittance of the laser beam, is used as the lens, while the material such as ASA (acrylonitrile styrene acrylate), which absorbs the laser beam, is used as the housing.

Meanwhile, if a color of the housing is gray, carbon as the laser absorbent is mixed into the resin material. Therefore, the laser welding can be applied to such housing.

By the way, in the vehicle lighting device, especially the car lighting equipment, normally the pleasant appearance of the welded portion of the housing when such portion is looked through the lens is improved by coloring the housing in a chromatic color in the similar color range to the color of the lens.

However, because no carbon is contained in the resin material of the chromatic color, it is impossible to apply the laser welding as it is. For this reason, it is indispensable to apply previously the laser absorbent to the welded portion of the housing prior to the laser welding. The application of the laser absorbent to the laser welded portion is executed by the method of coating the laser absorbent, pasting the sheet-like laser absorbent, or the like, for example.

The previous application of the laser absorbent to the welded portion of the housing prior to the laser welding increases the steps by one step, and such a problem lies that the workability becomes worse. Also, the method of coating the laser absorbent needs the additional equipment, e.g., care about the work environment, or the like because of the presence of the solvent, and others. Further, the sheet of the laser absorbent is expensive.

SUMMARY OF THE INVENTION

Therefore, it is an object of the present invention to improve a pleasant appearance of a vehicle lighting device in which a lens and a housing are joined together by the laser welding, especially an inner area of pleasing appearance when such inner area is looked through a lens, without any trouble such as a decrease in workability, an increase in cost, or the like.

In order to achieve the above subject, in the vehicle lighting device of the present invention, the carbon of 0.01 to 0.1% is contained in the thermoplastic resin of the chromatic color.

Therefore, in the vehicle lighting device of the present invention, the lens and the housing can be joined together by the laser welding and also a tint of color of the housing is never spoiled.

A vehicle lighting device of the present invention in which a housing having a concave portion, which is opened forward, and a lens for covering a front opening of the housing are joined together by a laser welding, wherein the housing is formed of a thermoplastic resin of a chromatic color, and carbon of 0.01 to 0.1% is contained in the thermoplastic resin of the chromatic color.

Therefore, in the vehicle lighting device of the present invention, since the carbon of 0.01 to 0.1% is contained in the thermoplastic resin of the chromatic color used as the material of the housing, the lens and the housing can be joined together by the laser welding and also a sufficient welding strength can be ensured. Also, since the carbon content is suppressed lower than 0.1%, a tint of color of the chromatic color is never spoiled. Accordingly, because an external appearance of the housing is are colored in the chromatic color having a tint of color, the pleasant appearance can be improved. Also, because the color of the welded portion when looked through the lens is the chromatic color, the pleasant appearance can be improved from this aspect.

Further, the housing has a welded portion on a peripheral portion of an opening portion of the concave portion, and a surface treatment is applied to an inner surface of the concave portion to constitute a reflection plane, and the surface treatment is not applied to the welded portion. Therefore, the laser welding can be applied and also the pleasant appearance can be improved. In other words, since the thermoplastic resin of the chromatic color containing the carbon is exposed from the welded portion as the ground material as it is, the laser welding can be applied to the welded portion. Also, in the related art, if the material resin of the housing has a gray color, the welded portion when looked through the lens looks like blackish. Thus, when the vehicle lighting device is viewed from the front side, a blackish frame appears around the reflection plane to degrade the pleasant appearance. In the present invention, since the welded portion when looked through the lens is colored in the chromatic color, the pleasant appearance can be improved.

Further, the lens is formed of a colored transparent thermoplastic resin that is colored in a similar color range to the thermoplastic resin of the chromatic color as material of the housing. Therefore, because the lens and the housing are colored in the similar color range, the pleasant appearance can be further improved. Also, because the welded portion when looked through the lens has the chromatic color in the similar color range to the lens, the welded portion is not conspicuous at all and the pleasant appearance can be improved.

DETAILED DESCRIPTION OF THE INVENTION

A best mode for carrying out a vehicle lighting device of the present invention will be explained with reference to the accompanying drawings hereinafter.

Figure 1:
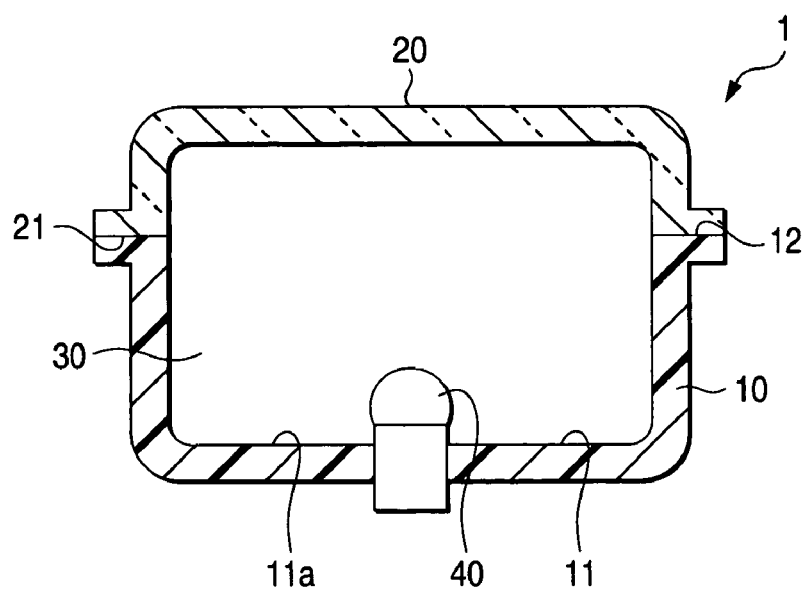
FIG. 1 is a schematic longitudinal sectional view showing an embodiment of a vehicle lighting device of the present invention.
Figure 2:
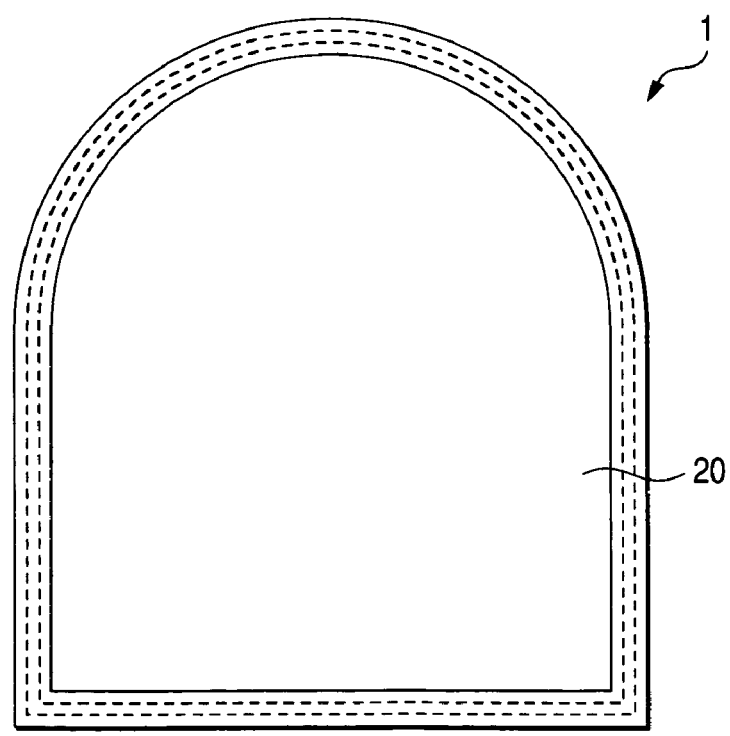
FIG. 2 is a schematic front view showing the same.

FIG. 1 is a sectional view showing an embodiment of a vehicle lighting device of the present invention, and FIG. 2 is a front view showing the same. In a vehicle lighting device 1, an opening edge portion of a lens 20 is joined together to an opening edge portion of a housing 10 having a concave portion 11 that is opened forward. Thus, a lighting equipment space 30 that is surrounded with the housing 10 and the lens 20 is formed. A light source bulb 40 that is supported in the rear center area of the housing 10 is installed in the lighting equipment space 30.

A welded portion 12 directed forward is formed on an opening edge portion of the housing 10 over an entire periphery. Also, a surface treatment is applied to an inner surface 11a of the concave portion 11 by using the appropriate method such as the coating, the vacuum evaporation, the sputtering, or the like to constitute a reflection plane.

The above housing 10 is formed of a thermoplastic resin of a chromatic color, e.g., ASA. Then, carbon is contained in the thermoplastic resin of a chromatic color in a range of 0.01 to 0.1%. It is preferable that the housing 10 should be colored in a chromatic color in the similar color range to the lens 20. For example, it is preferable that the housing 10 should be colored in the red range if the color of the lens 20 is red, the housing 10 should be colored in the pink range if the color of the lens 20 is pink, and the housing 10 should be colored in the orange range or the yellow range if the color of the lens 20 is amber. Therefore, the lens 20 and the housing 10 are colored in the similar color range as an impression of the overall lighting device to improve the pleasant appearance, and also the welded portion 12 when looked through the lens 20 has a chromatic color of the similar color of the lens 20 to improve the pleasant appearance from this aspect. In the related art, if a material resin of the housing has a gray color, the welded portion 12 when looked through the lens looks like blackish. Thus, when the vehicle lighting device is viewed from the front side, a blackish frame appears around the reflection plane to degrade the pleasant appearance. In the present embodiment, since the welded portion when looked through the lens is colored in the chromatic color of the similar color of the lens, simply the reflection plane 11a can be looked through the lens 20 and also the pleasant appearance can be improved.

The lens 20 is formed of a transparent thermoplastic resin, for example, acrylic resin, polycarbonate, or the like. A welded portion (surface) 21 directed backward is formed on a peripheral portion of the lens 20 over an entire periphery.

Then, the welded portion 12 of the housing 10 is irradiated with the laser beam like a spot welding in a state that the welded portion 21 of the lens 20 comes into contact with the welded portion 12 of the housing 10. Since the carbon of 0.01 to 0.1% is contained in the thermoplastic resin of the chromatic color as the material of the housing 10, the welded portion 12 of the housing 10 irradiated with the laser beam generates a heat and melts, and then the welded portion 21 of the lens 20 also generates a heat and melts by the thermal conduction. Accordingly, the welded portions 12, 21 are melted in their compatible state and fused together. Then, the welded portions 12, 21 are fixed together after the welded portions 12, 21 are cooled. In this manner, the lens 20 and the housing 10 are joined together by the laser welding.

Then, because the welded portion 12 of the housing 10 and the welded portion 21 of the lens 20 are subjected to the laser welding, the welded portion 12 of the housing 10 can be looked through the lens 20. At this time, the welded portion 12 of the housing 10 has the chromatic color when looked through the lens 20. Therefore, an evaluation of a tint of color of the welded portion 12 of the housing 10 when looked through the lens 20 and the welding strength thereof are shown in Table 1.

As respective samples shown in Table 1, five samples were prepared and evaluated respectively. In these samples, the ASA of a red color (chromaticity coordinate: Y=13.07, x=0.4652, y=0.3214) was used as the material of the lens 20, the coloring carbon black (product name: Toka Black Series) manufactured by Tokai Carbon Co., Ltd. was used as the carbon, the red (chromaticity coordinate: Y=21.6, x=0.687, y=0.313) acrylic (product name: Acry Pet VH) manufactured by Mitsubishi Rayon Co., Ltd. was used as the material of the lens 20, a thickness of the portion on which the welded portion 21 of the lens 20 is positioned was set to 3 mm, a width of the welded portions 12, 21 was set to 5 mm respectively, and the carbon content was set to 0%, 0.01%, 0.05%, 0.1%, and 0.15%. In this case, except the sample whose carbon content is 0%, the welded portion 21 of the lens 20 and the welded portion 12 of the housing 10 were joined by the laser welding. However, because it is unfeasible to apply the laser welding to the sample that contains no carbon, a tint of color of the welded portion 12 and the welding strength were evaluated in a state that the welded portion 21 of the lens 20 and the welded portion 12 of the housing 10 are simply butted.

In the evaluation of a tint of color in Table 1, a tint of color of the welded portion 12 of the housing 10 when looked through the lens 20 was evaluated by observing it from the position that is away from the lens 20 by 0.5 m. Then, the sample having the good tint of color was evaluated as ⊚, the sample whose tint of color is employable in the actual product was evaluated as ○, and the sample whose appearance in employing in the actual product is bad was evaluated as X. Also, the welding strength was measured based on Japan Industrial Standard (JIS) K7161. Then, the sample whose welding strength is below 10 MPa was evaluated as X, the sample whose welding strength is more than 10 MPa but below 15 MPa was evaluated as ○, and the sample whose welding strength is more than 15 PMa was evaluated as ⊚.

TABLE 1

| Carbon content | Tint of color | Deposition strength |
|---|---|---|
| 0% | ⊚ | X (0 MPa) |
| 0.01% | ⊚ | ○ (10 MPa) |
| 0.05% | ⊚ | ⊚ (15 MPa) |
| 0.1% | ○ | ○ (10 MPa) |
| 0.15% | X | X (5 MPa) |

In Table 1, it was evaluated that, if both the tint of color and the welding strength are rated as ⊚ or ○, the sample has no trouble in practical use.

As shown above, according to the vehicle lighting device 1 of the present invention, the lens 20 and the housing 10 can be joined together by the laser welding, and also an overall external appearance and an external appearance of the welded portion can be improved.

Here, all shapes and structures of respective portions shown in the above embodiment illustrate only one instance out of various embodiments that are applicable in embodying the present invention. Therefore, the technical scope of the present invention should not be interpreted limitatively on the basis of these portions.

The vehicle lighting device of the present invention is suitable for the application of the lighting device that attaches particularly great importance to the external appearance and the strength.

We claim:

1. A vehicle lighting device comprising:
    a housing having a concave portion, which is opened forward; and
    a lens for covering a front opening of the housing, wherein
        the housing and lens are joined together by a laser welding,
        the housing is formed of a thermoplastic resin of a chromatic color, and
        carbon of 0.01 to 0.1% is contained in the thermoplastic resin of the chromatic color.

2. The vehicle lighting device according to claim 1, wherein the housing has a welded portion on a peripheral portion of an opening portion of the concave portion, and a surface treatment is applied to an inner surface of the concave portion to constitute a reflection plane, and the surface treatment is not applied to the welded portion.

3. The vehicle lighting device according to claim 1, wherein the lens is formed of a colored transparent thermoplastic resin in a similar color range as the thermoplastic resin of the chromatic color as material of the housing.

4. The vehicle lighting device according to claim 2, wherein the lens is formed of a colored transparent thermoplastic resin in similar color range as the thermoplastic resin of the chromatic color as material of the housing.

* * * * *